(12) United States Patent
Riveret et al.

(10) Patent No.: US 12,088,716 B2
(45) Date of Patent: Sep. 10, 2024

(54) MONITORING A MANUFACTURING PROCESS

(71) Applicant: Commonwealth Scientific and Industrial Research Organisation, Acton (AU)

(72) Inventors: Regis Riveret, Acton (AU); Silvano Colombo Tosatto, Acton (AU); Nick Van Beest, Acton (AU); Guido Governatori, Acton (AU)

(73) Assignee: Commonwealth Scientific and Industrial Research Organisation Action, Acton (AU)

( * ) Notice: Subject to any disclaimer, the term of this patent is extended or adjusted under 35 U.S.C. 154(b) by 519 days.

(21) Appl. No.: 17/288,142

(22) PCT Filed: Oct. 23, 2019

(86) PCT No.: PCT/AU2019/051158
§ 371 (c)(1),
(2) Date: Apr. 23, 2021

(87) PCT Pub. No.: WO2020/087106
PCT Pub. Date: May 7, 2020

(65) Prior Publication Data
US 2021/0385084 A1    Dec. 9, 2021

(30) Foreign Application Priority Data

Oct. 31, 2018  (AU) ................................ 2018904146

(51) Int. Cl.
*H04L 9/32* (2006.01)
*G05B 19/048* (2006.01)
*H04L 9/00* (2022.01)

(52) U.S. Cl.
CPC ............. *H04L 9/32* (2013.01); *G05B 19/048* (2013.01); *H04L 9/008* (2013.01); *G05B 2219/24015* (2013.01)

(58) Field of Classification Search
CPC ......... H04L 9/32; H04L 9/008; H04L 9/3239; H04L 9/50; G05B 19/048; G05B 2219/24015
See application file for complete search history.

(56) References Cited

U.S. PATENT DOCUMENTS

| 6,671,874 B1 * | 12/2003 | Passova | ................ G06F 8/73 |
| | | | 717/126 |
| 2015/0318991 A1 * | 11/2015 | Yasuda | ................ H04L 9/008 |
| | | | 380/28 |

(Continued)

FOREIGN PATENT DOCUMENTS

WO    WO 2017/161417 A1    9/2017

OTHER PUBLICATIONS

B. Carminati, et al., "Confidential Business Process Execution on Blockchain," 2018 IEEE International Conference on Web Services (ICWS), downloaded from the Internet on Feb. 24, 2021, from https://www.researchgate.net/publication/327484030.

(Continued)

*Primary Examiner* — Maung T Lwin
*Assistant Examiner* — Suman Debnath
(74) *Attorney, Agent, or Firm* — Crowell & Moring LLP

(57) ABSTRACT

The present disclosure relates to monitoring processes. A processor creates a numerical representation of a nominal operation of the process. The processor then encrypts the numerical representation using homomorphic encryption to determine an encrypted numerical representation that blocks access to the numerical representation but allows calculations on the numerical representations. The processor proceeds by creating smart contracts on a blockchain platform using the encrypted numerical representation as a first input to the calculations of the smart contract. Next, the processor attempts execution of the smart contract using the current operation of the process as a second input to the calculations of the smart contract. The execution of the smart contract generates an output result by performing the calculations on the encrypted numerical representations. Based on the output of the execution of the smart contract, the processor finally determines that the current operation is outside the nominal operation.

22 Claims, 12 Drawing Sheets

(56) References Cited

U.S. PATENT DOCUMENTS

| | | |
|---|---|---|
| 2017/0155515 A1 | 6/2017 | Androulaki et al. |
| 2018/0094953 A1 | 4/2018 | Colson et al. |
| 2018/0247045 A1* | 8/2018 | David .................... H04L 67/12 |
| 2020/0005559 A1* | 1/2020 | Grunbok, II .......... H04L 9/3239 |

OTHER PUBLICATIONS

K. Christidis, et al., "Blockchains and Smart Contracts for the Internet of Things," IEEE Access vol. 4, pp. 2292-2303, Jun. 3, 2016.

International Search Report for corresponding International application No. PCT/AU2019/051158, mailed Nov. 22, 2019, 5 pgs.

Written Opinion of the International Searching Authority for corresponding International application No. PCT/AU2019/051158, mailed Nov. 22, 2019, 5 pgs.

* cited by examiner

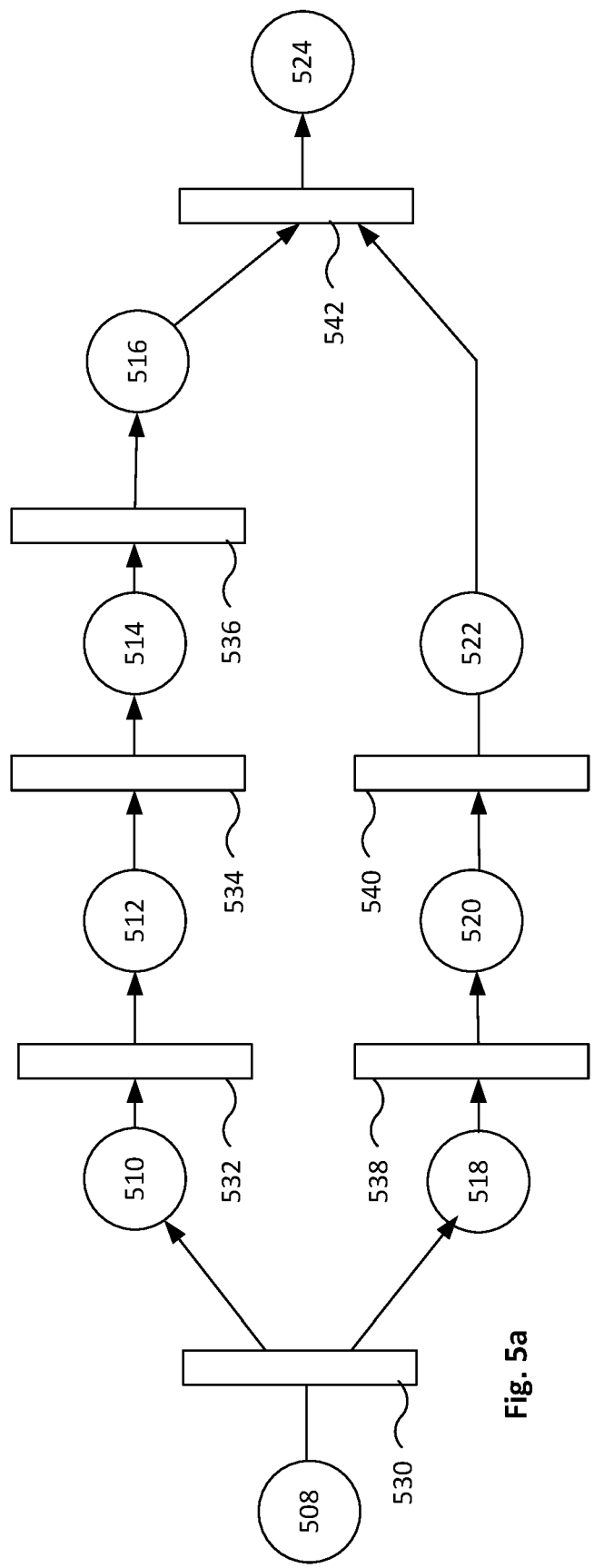
Fig. 5a
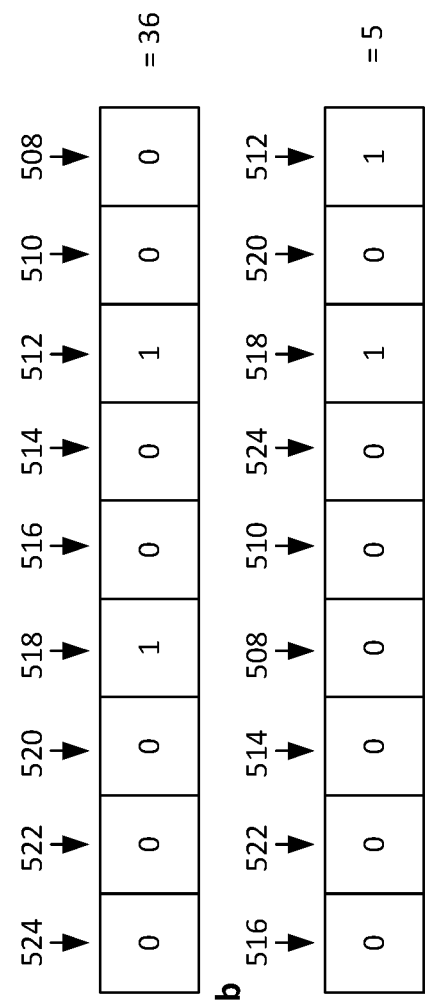
Fig. 5b
Fig. 5c

| | 530 | 532 | 534 | 536 | 538 | 540 | 542 |
|---|---|---|---|---|---|---|---|
| 508 | 1 | 0 | 0 | 0 | 0 | 0 | 0 |
| 510 | 0 | 1 | 0 | 0 | 0 | 0 | 0 |
| 512 | 0 | 0 | 1 | 0 | 0 | 0 | 0 |
| 514 | 0 | 0 | 0 | 1 | 0 | 0 | 0 |
| 516 | 0 | 0 | 0 | 0 | 1 | 0 | 0 |
| 518 | 0 | 0 | 0 | 0 | 0 | 1 | 0 |
| 520 | 0 | 0 | 0 | 0 | 0 | 0 | 1 |
| 522 | 0 | 0 | 0 | 0 | 0 | 0 | 1 |
| 524 | 0 | 0 | 0 | 0 | 0 | 0 | 0 |

Fig. 6a

| | 530 | 532 | 534 | 536 | 538 | 540 | 542 |
|---|---|---|---|---|---|---|---|
| 508 | 0 | 0 | 0 | 0 | 0 | 0 | 0 |
| 510 | 1 | 0 | 0 | 0 | 0 | 0 | 0 |
| 512 | 0 | 1 | 0 | 0 | 0 | 0 | 0 |
| 514 | 0 | 0 | 1 | 0 | 0 | 0 | 0 |
| 516 | 0 | 0 | 0 | 1 | 0 | 0 | 0 |
| 518 | 1 | 0 | 0 | 0 | 0 | 0 | 0 |
| 520 | 0 | 0 | 0 | 0 | 1 | 0 | 0 |
| 522 | 0 | 0 | 0 | 0 | 0 | 1 | 0 |
| 524 | 0 | 0 | 0 | 0 | 0 | 0 | 1 |

Table 3

|    | Transitions preset | | | | | | | Transitions postset | | | | | | |
|----|---|---|---|---|---|---|---|---|---|---|---|---|---|---|
|    | A | B | C | D | E | F | G | A | B | C | D | E | F | G |
| p1 | 1 | 0 | 0 | 0 | 0 | 0 | 0 | 0 | 0 | 0 | 0 | 0 | 0 | 0 |
| p2 | 0 | 1 | 0 | 0 | 0 | 0 | 0 | 1 | 0 | 0 | 0 | 0 | 0 | 0 |
| p3 | 0 | 0 | 1 | 0 | 0 | 0 | 0 | 0 | 1 | 0 | 0 | 0 | 0 | 0 |
| p4 | 0 | 0 | 0 | 1 | 0 | 0 | 0 | 0 | 0 | 1 | 0 | 0 | 0 | 0 |
| p5 | 0 | 0 | 0 | 0 | 0 | 0 | 1 | 0 | 0 | 0 | 1 | 0 | 0 | 0 |
| p6 | 0 | 0 | 0 | 0 | 1 | 0 | 0 | 1 | 0 | 0 | 0 | 1 | 0 | 0 |
| p7 | 0 | 0 | 0 | 0 | 0 | 1 | 0 | 0 | 0 | 0 | 0 | 1 | 0 | 0 |
| p8 | 0 | 0 | 0 | 0 | 0 | 0 | 1 | 0 | 0 | 0 | 0 | 0 | 1 | 0 |
| p9 | 0 | 0 | 0 | 0 | 0 | 0 | 0 | 0 | 0 | 0 | 0 | 0 | 0 | 1 |

{ A } — Transitions preset
{ B } — Transitions postset

Fig. 11

MONITORING A MANUFACTURING PROCESS

RELATED APPLICATIONS

This application is the U.S. National Stage application of PCT application no. PCT/AU2019/051158, filed on 23 Oct. 2019, titled "Monitoring a Manufacturing Process," designating the United States the content of which is incorporated herein by reference in its entirety. PCT application no. PCT/AU2019/051158 claims priority from Australian provisional application no. 2018904146 filed on 31 Oct. 2018, the contents of which are incorporated herein by reference in their entirety.

TECHNICAL FIELD

The present disclosure relates to monitoring processes and in particular, but not limited to, monitoring a current operation of a pharmaceutical manufacturing plant.

BACKGROUND

Pharma manufacturing is the process of industrial-scale synthesis of pharmaceutical drugs. The process of drug manufacturing can be broken down into a series of unit operations, such as milling, granulation, coating, tablet pressing, and others. Before a drug can be manufactured at any scale, much work goes into the actual formulation of the drug. Formulation development scientists evaluate a compound for uniformity, stability and many other factors. After the evaluation phase, a solution is developed to deliver the drug in its required form such as solid, semi-solid, immediate or controlled release, tablet or capsule. A wide range of excipients may be blended together to create the final blend used to manufacture the solid dosage form. The range of materials that may be blended (excipients, API), presents a number of variables which are addressed to achieve products of acceptable blend uniformity. These variables may include the particle size distribution (including aggregates or lumps of material), particle shape (spheres, rods, cubes, plates, and irregular), presence of moisture (or other volatile compounds), and particle surface properties (roughness, cohesivity). During the drug manufacturing process, milling is often required in order to reduce the average particle size in a drug powder. There are a number of reasons for this, including increasing homogeneity and dosage uniformity, increasing bioavailability, and increasing the solubility of the drug compound. Granulation can be described as the opposite of milling; it is the process by which small particles are bound together to form larger particles, called granules. Granulation is used for several reasons. Granulation prevents the "demixing" of components in the mixture, by creating a granule which contains all of the components in their required proportions, improves flow characteristics of powders (because small particles do not flow well), and improves compaction properties for tablet formation. Hot melt extrusion may be utilized in pharmaceutical solid oral dose processing to enable delivery of drugs with poor solubility and bioavailability. Hot melt extrusion may be used to molecularly disperse poorly soluble drugs in a polymer carrier increasing dissolution rates and bioavailability. The process involves the application of heat, pressure and agitation to mix materials together and 'extrude' them through a die. Twin-screw high shear extruders blend materials and simultaneously break up particles. The resulting particles can be blended and compressed into tablets or filled into capsules.

This shows that pharma manufacturing is complex and involves a large number of parameters that need to be within their correct nominal ranges and steps that need to follow each other in a prescribed nominal sequence. At the same time, there is a trend towards lean manufacturing and digital manufacturing. However, these new ways of business organisation require technical solutions as enablers. In particular, there is a concern about confidentiality between a multitude of parties in a supply chain. There is currently a challenge of ensuring that the processes by all entities are compliant with an overarching rule set. At the same time, however, the actual process together with nominal process parameters and a nominal sequence of steps should not be disclosed to third parties. Therefore, there is a need for a computer system that underlies the supply chain and/or the manufacturing process and that can check for compliance of the process without disclosing the "secret recipe".

Blockchain networks provide a trustless environment, which does not rely on any centralized trusted 3rd party. Blockchain data structure is a distributed ledger maintained by nodes of a peer-to-peer network. The public ledger stores all the time-stamped transactions happening in the system. A distributed consensus protocol is used to agree on which transaction should be included into the public ledger and which should not. Every transaction is verified by all the network participants before being included into the public ledger.

In a multi-party process, organisations may delegate certain parts of process to external parties. Different parts of the process may be executed by different organisations. Often in such a situation, trust among the involved parties may be limited. In most cases proprietary information regarding individual business processes should remain private. Execution of activities and transfer of data is subject to conditions governing such activities. Each party wants to ensure that the "outsourced" part of the process is executed as agreed and according to the conditions that apply. Due to the lack of trust and insight in each other's processes, current process execution tools cannot ensure compliance across such a service chain.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

There is provided a method for manufacturing a pharmaceutical compound by monitoring a current operation of a pharmaceutical manufacturing plant. The method comprises:
  creating a numerical representation of a nominal operation of the pharmaceutical manufacturing plant;
  encrypting the numerical representation using homomorphic encryption to determine an encrypted numerical representation that blocks access to the numerical representation but allows calculations on the numerical representations;

creating smart contracts on a blockchain platform using the encrypted numerical representation as a first input to the calculations of the smart contract;

attempting execution of the smart contract using the current operation of the pharmaceutical manufacturing plant as a second input to the calculations of the smart contract, execution of the smart contract generating an output result by performing the calculations on the encrypted numerical representations;

based on the output of the execution of the smart contract determine that the current operation is outside the nominal operation.

A method for monitoring a current operation of a process comprises:

creating a numerical representation of a nominal operation of the process;

encrypting the numerical representation using homomorphic encryption to determine an encrypted numerical representation that blocks access to the numerical representation but allows calculations on the numerical representations;

creating smart contracts on a blockchain platform using the encrypted numerical representation as a first input to the calculations of the smart contract;

attempting execution of the smart contract using the current operation of the process as a second input to the calculations of the smart contract, execution of the smart contract generating an output result by performing the calculations on the encrypted numerical representations;

based on the output of the execution of the smart contract determining that the current operation is outside the nominal operation.

Determining that the current operation is outside the nominal operation may be in response to determining failure to execute the smart contract.

The method may further comprise blocking the current operation of the process upon determining that the current operation is outside the nominal operation.

The method may further comprise upon determining that the current operation is outside the nominal operation, allowing further execution of the process and generating a report indicating that the current operation is outside the nominal operation.

Creating the numerical representation of the nominal operation may comprise creating a petri net of the nominal operation and creating a numerical representation of the petri-net.

The numerical representation may indicative of places of the nominal operation and valid transitions between the places, may comprise multiple binary nominal vectors, and each of the multiple binary nominal vectors may represent one of the valid transitions between the places.

The multiple binary nominal vectors may comprise for each transition a binary preset vector indicative of one or more places that enable that transition and a binary postset vector indicative of one or more possible places after that transition.

Creating the numerical representation may comprise determining multiple traces through the places and transitions and determining the preset vectors and postset vectors such that the preset vectors and postset vectors represent the multiple traces.

The current operation of the process may be represented by a binary current state vector and the smart contracts comprise a binary operation based on the current state vector and the encrypted nominal vectors.

The calculations of the smart contracts may comprise a binary operation based on a previous state vector indicative of a previous state of the operation.

The calculations of the smart contracts may comprise a binary operation between an encrypted previous state vector and an encrypted current state vector.

The calculations of the smart contract may comprise a selection of transitions based on a binary operation using an encrypted postset vector and based on the encrypted postset vector.

The calculations of the smart contract may comprise a binary AND operation between an encrypted previous state vector and an encrypted current state vector and a binary XOR operation between the encrypted current state vector and the result of the AND operation.

The calculations of the smart contract may comprise a selection of transitions where the result of an AND operation between the encrypted postset vector and the result of the XOR operation is equal to the encrypted postset vector.

The calculations of the smart contract may comprise a condition that the result of the selection is equal to a set of transitions enabled by the current state of the operation.

Attempting execution of the smart contract may comprise attempting to satisfy the condition by performing the calculations.

The smart contract may be configured such that a success of the execution of the smart contract leads to integration of a transaction into the blockchain.

The transaction integrated into the blockchain may represent a valid transition to the current state.

Creating the smart contracts may comprise checking the smart contracts for compliance against a set of rules.

Software, when executed by a computer, causes the computer to perform the above method.

A system for monitoring a current operation of a process comprises:

a data store;

a processor configured to:

create a numerical representation of a nominal operation of the process and store the created numerical representation on the data store;

encrypt the numerical representation using homomorphic encryption to determine an encrypted numerical representation that blocks access to the numerical representation but allows calculations on the numerical representations;

create smart contracts on a blockchain platform using the encrypted numerical representation as a first input to the calculations of the smart contract;

attempt execution of the smart contract using the current operation of the process as a second input to the calculations of the smart contract, execution of the smart contract generating an output result by performing the calculations on the encrypted numerical representations;

based on the output of the execution of the smart contract determining that the current operation is outside the nominal operation.

BRIEF DESCRIPTION OF DRAWINGS

Examples of the present disclosure will be described with reference to:

FIG. 5a is an example representation of a process specification as a petri net, FIG. 5b is an illustration of a numerical representation of a state of the process, FIG. 5c is a illustration of an obfuscated numerical representation of a state of the process.

FIG. 6a is a matrix representation of the presets of a state, FIG. 6b is a matrix representation of the postsets of a state.

FIG. 10a shows an ascending ordering of places.

FIG. 10b shows a randomised ordering of the bits corresponding to the places.

FIG. 11 shows the matrix representation of the process depicted in FIG. 9a.

DESCRIPTION OF EMBODIMENTS

The following disclosure relates to a method and a system for executing or monitoring a current operation of a process. In one example, this disclosure applies to a pharma manufacturing process with the above parameters and sequences in addition to further process steps and further parameters. In those examples, the term "nominal operation" refers to process variables/parameters and sequences of steps that are prescribed for the pharma manufacturing process. However, the disclosure is equally applicable to other areas, such as intrusion detection of a computer system or other processes.

Although the disclosure describes the use of Ethereum, this is intended simply to be illustrative of a blockchain platform. It is noted that the blockchain platform may be based on a public ledger (readable without restriction or access control) or a private ledger that is only accessible by a consortium governed by access control, such as encryption or password protection. One reason for using Ethereum is that it natively supports smart contacts. Smart contracts are objects on the Ethereum blockchain and may hold "eth.accounts" objects. They contain computer code and can interact with other contracts, create new contracts, make decisions, store data, and send Ether to others. In the literature, the term 'smart contract' is used interchangeably to refer to both the code that is used to execute a smart contract and the actual executing or executed smart contract. For clarity, in this disclosure the term 'process instance' refers to the execution and services provided by the smart contract.

The current disclosure uses the term 'blockchain' to refer to actual blockchain itself (that is, the public shared ledger with blocks added sequentially). The current disclosure also uses the term blockchain in relation to a blockchain platform and a blockchain network. The term 'blockchain platform' is intended to refer to all the components that make the blockchain operate. This includes the wallet, code, transactions, the blockchain network, as well as the blockchain itself. Examples of blockchain platforms used in the disclosure include Bitcoin and Ethereum. Where the term blockchain network is used (for example the Ethereum blockchain network), this is intended to refer to the computers running the blockchain code that are able to communicate with each other via a communications network such as the Internet. Computers in the blockchain network are referred to as nodes, and a full node is a computer in the blockchain network that contains a copy of the entire blockchain.

Example System

Figure 1:
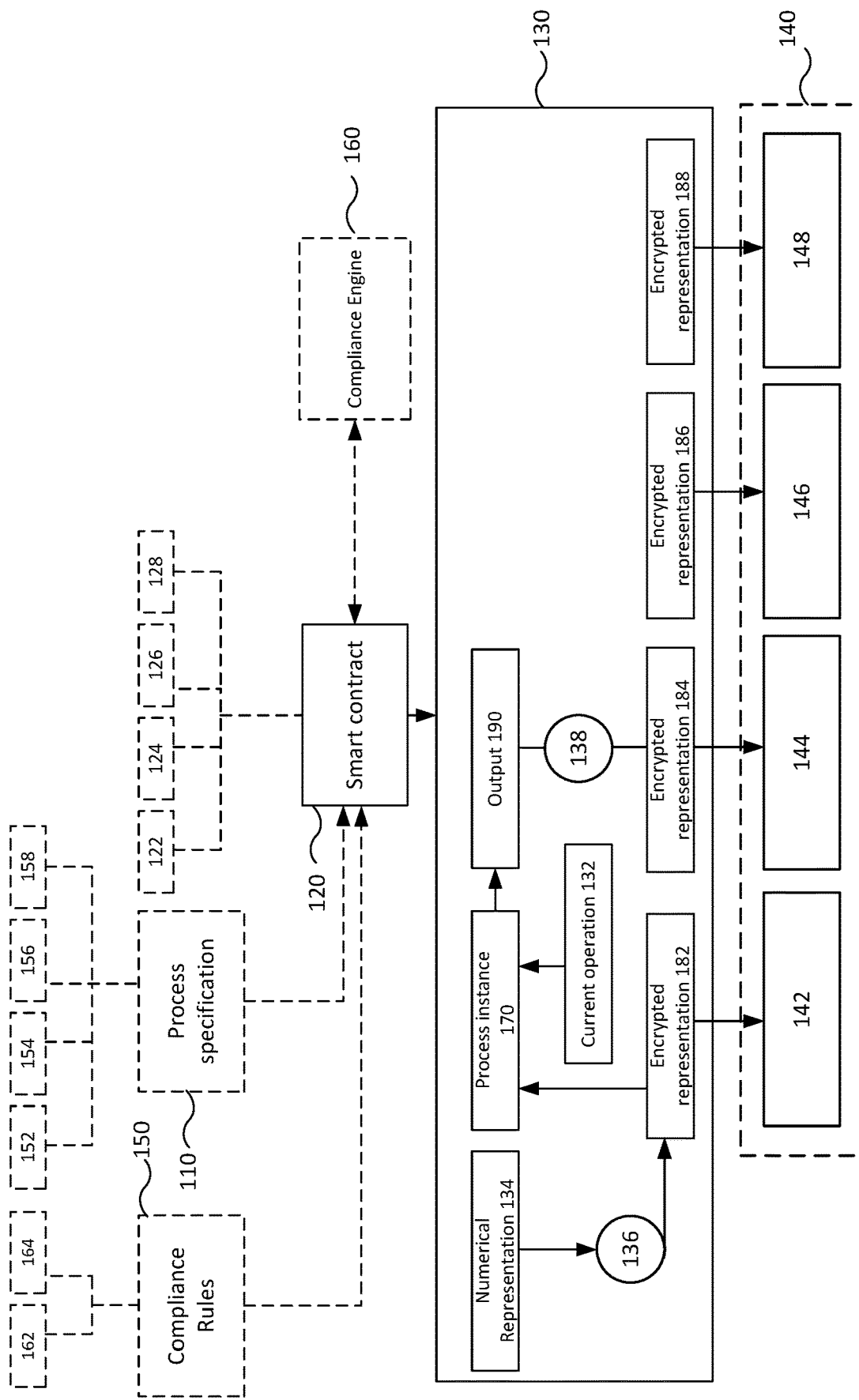
FIG. 1 illustrates an exemplary system.

FIG. 1 illustrates an example system 100 for monitoring a current operation of a pharmaceutical manufacturing process. The computer system 100 comprises a smart contract 120, an execution engine 130 and a blockchain 140, which comprises blocks 142, 144, 146 and 148.

The execution engine 130 creates a numerical representation 134 of a nominal operation of the computer system indicative of states of the nominal operation and valid transitions between the states.

The execution engine 130 then encrypts 136 the numerical representation 134 using homomorphic encryption to determine an encrypted numerical representation 182 that blocks access to the numerical representation but allows calculations on the encrypted numerical representations.

The execution engine 130 initiates a smart contract as a process instance on a blockchain platform using the encrypted numerical representation as a first input to the smart contract. The process instance is the execution of the smart contract on the blockchain.

The execution engine 130 then executes the process instance 170 using the current operation 132 of the computer system as a second input to the process instance, execution of the process instance generating an output result 190 by performing the calculations on the encrypted numerical representations 182.

The engine 130 will match 138 the output 190 to the intended result, which should be the encrypted representation 184. If the output result does not match the intended result, then the engine 130 will determine that the current operation is outside the nominal operation. The same determinations can be made for the encrypted representations 186 and 188, which are stored in the blockchain correspondingly in block 146 and block 148.

It is to be noted that the order of execution of the process instance 170 can be determined from the sequence of states and transitions of the numerical representation. Although the encrypted numerical representation is encrypted, the order of the states and transitions will be the same as the numerical representation. This works by utilising homomorphic encryption which enables a computation to be performed on an encrypted numerical value that, when decrypted, is the same as the computation performed on the numerical value itself.

Example Method

Figure 2:
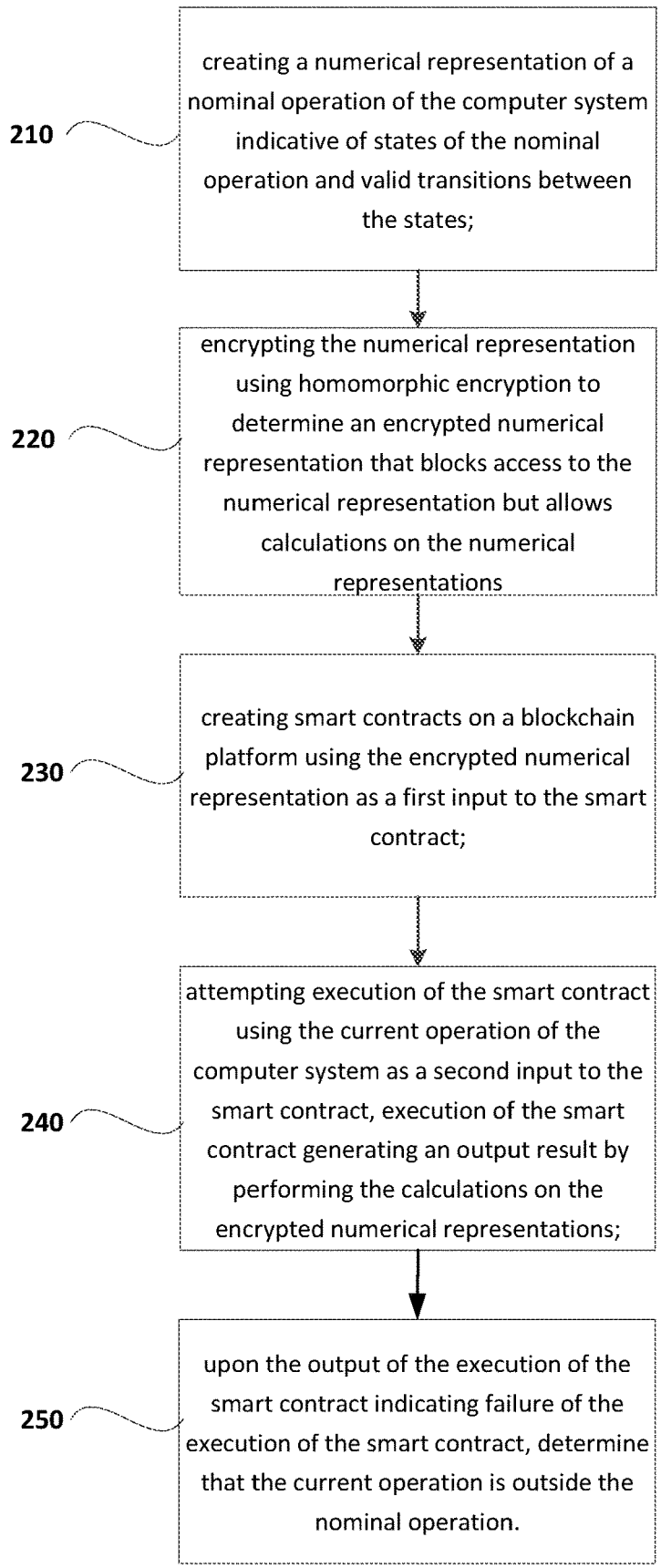
FIG. 2 illustrates a method for monitoring a current operation of a process.

FIG. 2 illustrates an example method. In this example, the system creates 210 a numerical representation of a nominal operation indicative of states of the nominal operation and valid transitions between the states. The system then encrypts 220 the numerical representation using homomorphic encryption to determine an encrypted numerical representation that blocks access to the numerical representation but allows calculations on the numerical representations.

The system then creates 230 smart contracts on a blockchain platform using the encrypted numerical representation as a first input to the smart contract and attempts execution 240 of the smart contract using the current operation of the computer system as a second input to the smart contract where the execution of the smart contract generates an output result by performing the calculations on the encrypted numerical representations. Creating the smart contracts in step 230 may comprise writing the actual string of the smart contract in the syntax used by the blockchain platform or may comprise deploying the smart contract into the blockchain platform.

Finally the system, based on the output of the execution of the smart contract, determines 250 that the current operation is outside the nominal operation. For example, the smart contract may be configured such that the smart contract raises an exception when the current operation is outside the nominal operation. In another example, the smart contract triggers a transaction to a first address (first public key) when the current operation is within the nominal operation and a transaction to a second address (second public key) when the current operation is outside the nominal operation. This way, the system can check the transaction and determine whether the operation is outside the nominal specification. In yet another example, the smart contract is configured such that it does not execute at all unless the current operation is within the nominal specification and therefore the system can, upon detecting failure of the smart contract to executed, indicate that the current operation is outside the nominal specification. In this sense and in case the current operation is outside the nominal specification, the system can either allow the current operation and report on it, or block the non-compliant operation.

Example General Scenario

One of the important attributes of the system is that a property of the smart contract that is checked prior to execution will hold if the smart contract is executed validly. This is advantageous where different parties have executed different parts of the process or where aspects of the process need to be kept hidden from other parties in the process and one or more properties of the smart contract are a requirement such as compliance or maintaining privacy. That is, although compliance of the process is checked during design time (ie prior to execution of the process), this attribute of the system allows to verify non-deviation from the process during execution. In order to illustrate this further, one example is provided here.

In this example, a party wants to provide a service without being required disclose the details of such service. Another party wants to use the service but wants to be sure that such service conforms with regulations. Each organisation that participates in the process is part of the blockchain environment in that they can read data from the blockchain.

Using this system, a party can ask the blockchain to verify the compliance level of an encrypted process stored but without having access to the process details. The blockchain can be used to verify the compliance of the encrypted process as a result of using homomorphic encryption.

The second party can send its encrypted input data to the blockchain for processing. As a result, the owner of the process cannot access the data being processed and any users of the blockchain system cannot access the data as well. Processing encrypted data is possible due to homomorphic encryption. The Process output is also encrypted.

Service processing of the data is executed on the blockchain. An execution trace is provided to allow to verify that the chosen service has been used (not possible to infer details from the execution trace as it is encrypted). Nested services' compliance requirements can be automatically verified against the provided regulations if required.

Additional Elements

There are some additional elements in FIG. 1 that are optional. These are explained in more detail below.

Process Specification

The process specification 110 contains the details of a process. The process specification 110 is a high level description of a state transition system of a process, which can be represented as a petri net. That is, transitions, places, arcs and conditions that define a process (see below). As a state transition system, the places correspond to a condition to the following transition(s). The distribution of tokens over the full set of places in a net (i.e. the marking) describes the state. Arcs connect a place to a transition or a transition to a place. The process specification 110 is intended to be a higher level description of a process than the smart contract, which contains the code and logic of how the process is executed.

Main Contract and Subcontracts

The smart contract 120 may be comprised of a main smart contract and one or more subcontracts. The main smart contract contains a description of the process to be executed by each participant, and the rules that apply to that process.

In one embodiment, the smart contract may be comprised of a main contract and one or more subcontracts. The main contract represents the logic or code that performs the choreography of the process. These subcontracts are a subset of the smart contract and represent logic or code that performs one or more smaller functions or operations. In some cases, a subcontract could be a single operation.

In the example in this disclosure, each transition is captured in a separate smart contract, which is triggered by the main smart contract when appropriate. This is because it is envisaged that in most situations the main smart contract triggers subcontracts for every transition that is to be read. However, in practice the distribution of the logic or code between the main contract and the subcontract will depend on the process and the participants and how the process is determined to be executed. It is possible for example that a subcontract could be quite a complex set of operations and perhaps even more complex than the main contract. It should be noted that in most cases there will be transition execution code that is part of subcontracts.

Compliance Rules

The smart contract may contain a set of rules which the process will be measured against for the purpose of determining compliance. These compliance rules 150 may comprise a larger number of rules. For example they may be company policies 162 or regulations 164 or they may simply be rules that define guidelines that require various levels of strict adherence. There could be for example a concern for privacy compliance, which is a company's accordance with established personal information protection guidelines, specifications or legislation. Privacy compliance is an increasing concern due to an increasing number of regulations designed to protect unauthorized access to personally identifiable information.

Prior to the first execution, the smart contract may be checked for compliance by the compliance engine 160 according to the set of compliance rules 150 as outlined in the contract. If the process is compliant, it can be executed. When composing processes across a service chain with multiple outsourcing providers, the same holds: prior to the first execution of the composition, the entire composition is checked for compliance subject to the rules applicable to that composition (as contained in the main smart contract and the relevant subcontracts).

This comprises a recursive application of the compliance engine 160 with respect to the smart contract 120 (and the subcontracts 122,124,126,128) that are part of the composition and the given compliance rules 150 applicable to those. Only activities relevant to the rules are explicitly formulated. Some are not visible to anyone, as their content is not relevant for the compliance of the smart contract.

It is important to note that the compliance of a process is intended to be checked at design time, that is before the smart contract is executed. That is the system does not propose to determine compliance of the executing process instance directly. Instead the compliance of the smart contract can be determined at design time, but at runtime it can be determined that the process was validly executed and therefore that the compliance of the smart contact therefore holds for the executed process as well.

In this context it is noted that there are three related concepts of soundness, conformance and compliance. The numerical representation of a process deployed on the blockchain through a smart contract is capable of producing every execution within the set of its nominal operations, assuming that the deployed process is correct (sound, meaning that it always terminates and each of its transitions can be potentially executed). A soundness check is typically performed prior to deployment. Assuming soundness, the smart contract will always execute without failing (except for external causes).

Conformance checking refers to the procedure of verifying whether an execution actually belongs to the set of nominal operations of a process. Informally, this verification is required when an organisation is adopting third party procedures, from which only the numerical representation of the execution is returned. The organisation can ensure that the execution actually belongs to the nominal operations of the process it actually wanted to use by performing such a conformance check.

Compliance is intended as compliance by design and is verified on the structure of the process, ensuring that each execution belonging to the nominal operation fulfils the required regulations.

These three concepts together allow ensuring that a third party procedure is compliant with some given requirements. That is, then every possible execution follows the given requirement, because it is possible to ensure it is belonging to the set of nominal operations through a conformance check.

Execution Engine

The process instance 170 can be initiated by executing the smart contract in the execution engine 130 on the blockchain. Much of the code and logic for the execution engine 130 will be found in the executing process instance 170. Where the smart contract 120 is composed of a main smart contract and sub contracts, there may be a corresponding process instance for each of the sub contracts that is different from the process instance 170 corresponding to the main smart contract.

The following is an example of the execution of a smart contract as a process instance 170 in Ethereum. In the Ethereum platform the execution, and services provided by the contract in its executable form as a process instance 170 are provided by the Ethereum network itself. The smart contracts can be initiated as a process instance 170 as long as the whole network exists, and the process instance 170 will only disappear if the process instance 170 was programmed to self-destruct. Although not provided by default, Solidity—the scripting language for Ethereum—provides a function to kill process instance 170.

The execution engine runs the choreography of the process as described in the main smart contract. The main contract and subcontracts can be useful because the subcontracts can be assigned and distributed to the participants in the process. During execution of the process a participant can execute their assigned subcontract. A state that represents the current state of execution may be written to the blockchain by the participant or by the process instance depending on how the process was determined to be executed.

In Ethereum, a smart contract has to be deployed before it can be executed. To deploy the smart contract as a process instance, the compiled code of the script and the Application Binary Interface (ABI) are required. The ABI defines how to interact with the process instance 170. Whereas an API defines an interface for source code to be utilised, an ABI defines the low-level binary interface between two or more pieces of software on a particular architecture. The ABI defines how the process instance will interact with itself, how the process instance interacts with the Ethereum network, and how the process instance 170 interacts with any code libraries. When compiling the smart contract script, a compiler will typically produce both the compiled code and the ABI.

During execution, the process state is captured and stored on the blockchain, such that the order of activities can be traced back. The smart contracts, executing as process instances, can manipulate the process state as required. Therefore participants in the process can perform their part of the process without ever having access to the process details.

It is worth noting that stateful data may be stored in the blockchain. For example there may be a main chain that records and manages process execution and one or more side chains that capture stateful data of the running process instance. If side chains are used, then as soon as the execution of the process instance is terminated, the stateful data is destroyed.

Example Sub Contracts

Figure 3:
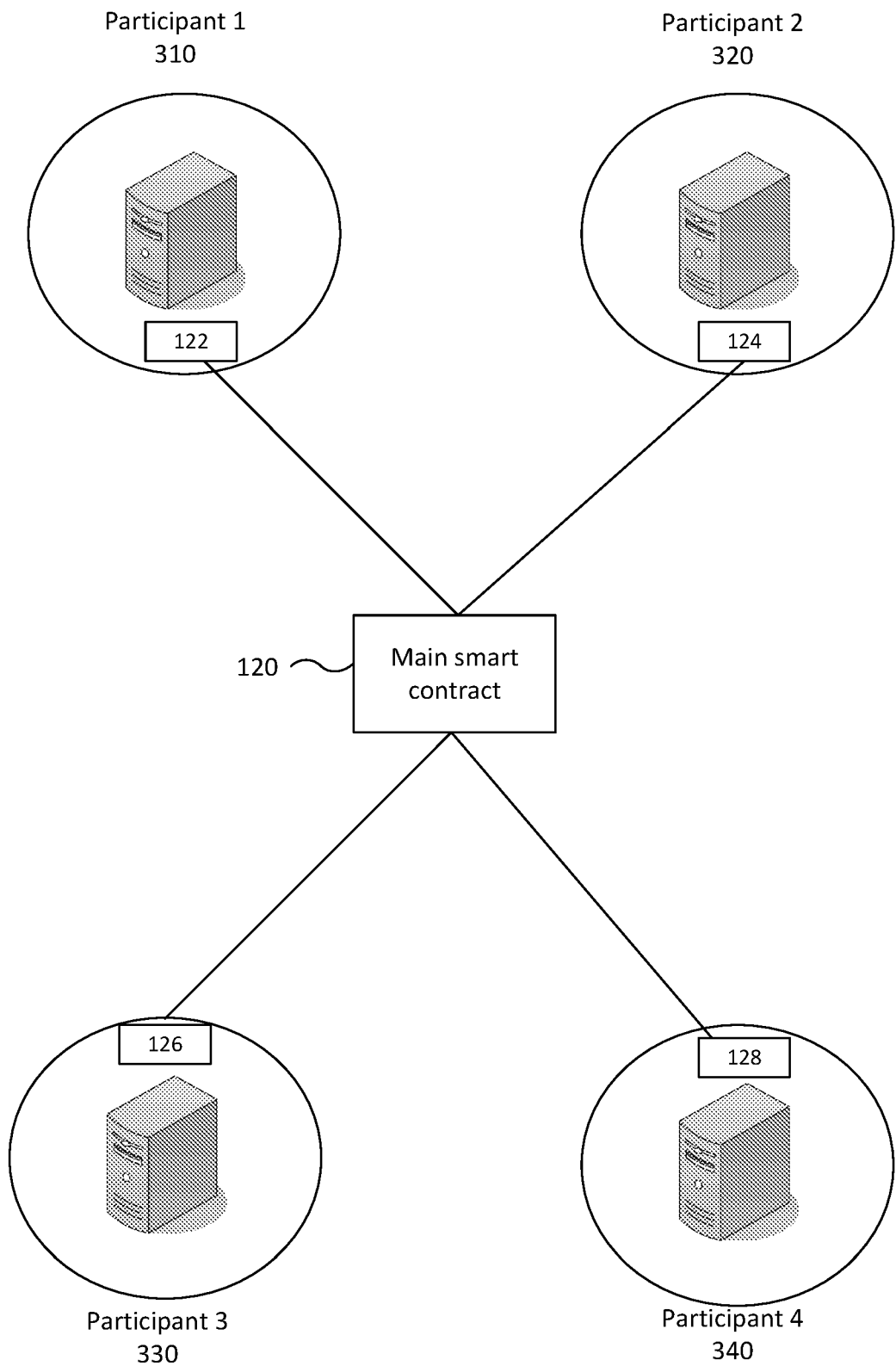
FIG. 3 illustrates an example scenario of main smart contracts and subcontracts.

FIG. 3 illustrates an example scenario with sub contracts. In this example, there are four participants: participant 1, 310, participant 2 320, participant 3 330 and participant 4 340. Each of the participants is associated with a node that is assigned to execute a sub contract. Participant 1 310 is assigned to execute subcontract 122, participant 2 320 is assigned to execute subcontract 124, participant 3 330 is assigned to execute subcontract 126 and participant 4 340 is assigned to execute subcontract 128. The main smart contract 120 contains triggers for each of the subcontracts to execute. The triggers indicate that the participant can execute the relevant subcontract.

Given the way that blockchain systems work, a subcontract may be executed as its own process instance on the blockchain. The subcontract process instance may simply wait for a message from the relevant participant before returning to the main process instance for further execution. In this sense, the subcontract process instance may simply ensure that the transition occurs and that any change in state is reflected on the blockchain, but the participant may execute an arbitrary amount of code off-chain that fits within the proper execution of the process. For example, participant 1 might be tasked with returning redacted private data that complies with a compliance rule that requires private data to be unidentifiable, but how participant 1 goes about redacting the private data is up to participant 1.

Example Execution Using Sub Contracts

Figure 4:
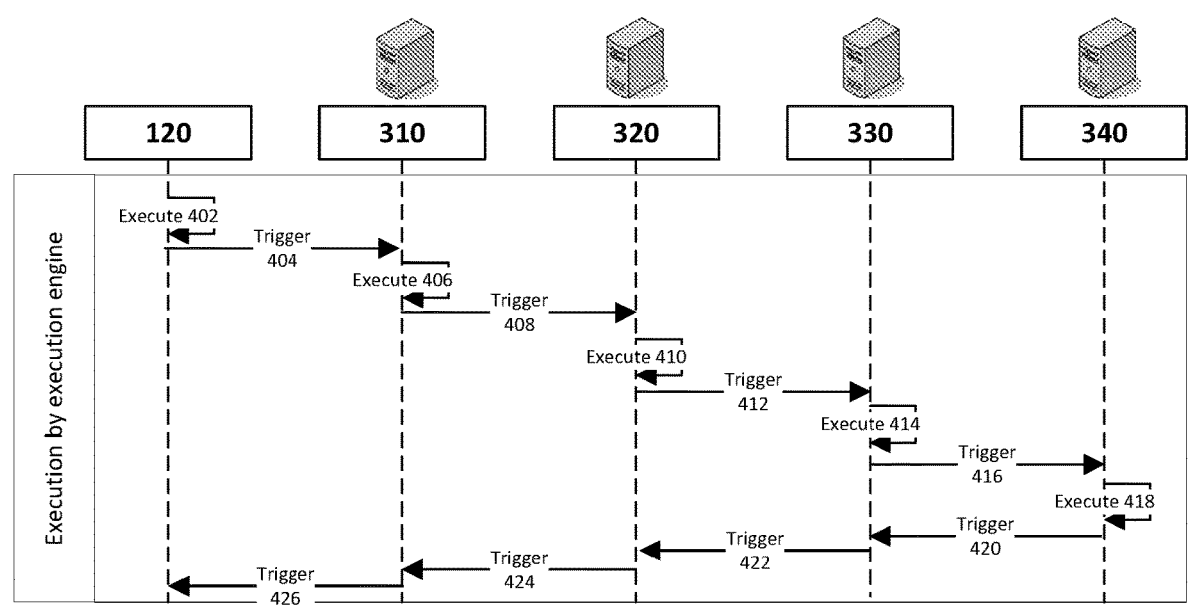
FIG. 4 is a sequence diagram that represents an example execution of a main smart contract and subcontract.

FIG. 4 illustrates a sequence diagram for how an execution of the above may occur. The execution engine 120 may execute 402 the smart contract as a process instance 170. For each transition in the smart contract, there is a trigger associated. In this case, the first transition triggers 404 the participant 310 to execute 406 the subcontract 122. Once the execution of subcontract 122 has occurred, this triggers 408 the participant 320 to execute 410 the subcontract 124. Similarly, the completed execution of 124 triggers 412 participant 330 to execute 414 subcontract 126. The completed execution of 126 triggers the execution of subcontract 128.

Once this subcontract has completed execution, the trigger 420 indicates to participant 330 that the execution has completed. Similarly, trigger 422 indicates to participant 320 that the execution has completed, which then triggers participant 310 to indicate the execution has completed. Finally, participant 310 indicates to the execution engine that the process has completed 120.

The above example only illustrates one way in which the execution of subcontract may occur. In another example, the execution engine may trigger each of the participants rather than the participants themselves.

Numerical Representation

In a formal sense, a state transition system is a pair $(S, \rightarrow)$ where S is a set of states and $\rightarrow$ is a set of state transitions (i.e., a subset of S×S). A transition from state p to state q (i.e. $(p, q) \in \rightarrow$), is written as $p \rightarrow q$. A labelled transition system is a tuple $(S, \Lambda, \rightarrow)$ where S is a set of states, A is a set of labels and $\rightarrow$ is a set of labelled transitions (i.e., a subset of S×Λ×S). This represents there is a transition from state p to state q with label $\alpha$. Labels can represent different things. Typical uses of labels include representing input expected, conditions that must be true to trigger the transition, or actions performed during the transition.

The nominal operation may be represented by a Petri net. Petri nets are directed bigraphs with nodes consisting of places and transitions. A place represents a condition. The distribution of tokens over the full set of places in a net describes the state. A transition in a transition system represents the move from one state to the next one. In a Petri net, a transition may represent a task or the transition may be "silent" ("tau" transition), which means it does not correspond to a task, but is used to enforce a certain control flow. The execution of such a task results in a new state, which is represented by a new marking. Petri nets can be converted to a state transition system and vice versa.

A labelled Petri net may be defined by a tuple $(P, T, A, \lambda)$, where: P is a set of places T is a set of transitions, such that $P \cap T = \emptyset$ $A \subseteq (P \times T) \cup (T \times P)$ is a set of arcs $\lambda: T \rightarrow \mathcal{L} \cup \{\tau\}$ is a labeling function, with $\mathcal{L}$ being a set of labels. A transition is said silent (representing internal, unobservable system behavior), if its corresponding label is $\tau$. The Petri net state, also referred to as the net marking $M: P \rightarrow \mathbb{N}_0$ is a function that associates each place $p \in P$ with a natural number (viz., place tokens). A labeled marked net $N = (P, T, A, \lambda, M_{=0})$ is a Petri net $(P, T, A, \lambda)$ together with an initial marking $M_0$.

Places and transitions are referred to as nodes. The preset of a node is denoted by $\bullet y = \{x \in P \cup T | (x, y) \in A\}$, and the postset of a node is denoted by $y \bullet = \{z \in P \cup T | (y, z) \in A\}$. $A^+$ and $A^*$ denote the irreflexive and reflexive transitive closure of A, respectively.

The execution semantics of Petri nets are defined in terms of markings as follows. If $\forall p \in \bullet t: M(p) > 0$, t is said to be enabled. The firing of t, denoted by $$M \xrightarrow{t} M',$$

leads to a new marking M', with $M'(p) = M(p) - 1$ if $p \in \bullet t \setminus t \bullet$, $M'(p) = M(p) + 1$ if $p \in t \bullet \setminus \bullet t$, and $M'(p) = M(p)$ otherwise. The marking $M_n$ is said to be reachable from M if there exists a sequence of transition firings $\sigma = t_1 t_2 \ldots t_n$ such that $$M \xrightarrow{t_1} M_1 \xrightarrow{t_2} \ldots \xrightarrow{t_n} M_n.$$

A marking M of a net is n-safe if $\forall p: M(p) \leq n$. A Petri net N is n-safe if all its reachable markings are n-safe. This disclosure uses 1-safe nets.

A numerical representation can be obtained by converting the preset and postset into numerical values as shown below. At any given point in the process instance, the distribution of the tokens over the places represents a state of the execution. Therefore the process state of the process instance is stored on the blockchain as an encrypted integer representing the marking of the petri net that represents the smart contract.

One consequence of utilising petri nets is that the state itself cannot be reverse engineered when the underlying process is unknown (e.g. by unauthorised parties), as each state is transformed into an integer, which is meaningless without knowledge of the underlying petri net.

One important aspect of petri nets is that the distribution of the tokens (i.e. marking) can be represented numerically. In one example, it is possible that the numerical representation may be a binary representation of the places that have been marked as 1's and the places that have not been marked as 0s.

FIG. 5*a* is an example of a petri net that can be executed on the blockchain. In this example there are a number of places 508, 510, 512, 514, 516, 518, 520, 522 and 524. The state 508 is the initial place and state 524 is the final place. As can be seen in the FIG. 5*a* the states 510, 512, 514 516 forms a branch of execution that is parallel to the places 518, 520 and 522. There are also a number of transitions 530, 532, 534, 536, 538, 540 and 542. The aim of this approach is to keep track of subsequent places (i.e. Petri net markings) on the blockchain, such that anyone familiar with the process can identify the Petri net state at a given point in time, and others cannot. That is, privacy of the process can be maintained.

FIG. 5*b* is an example of how a marking can be transformed into an integer. FIG. 5*b* shows an ascending ordering of places. Each place is represented by a bit in a bit array. Whenever the place contains a token, the corresponding bit is set to 1, or 0 otherwise. Consequently, if the execution in the petri net 5*a* was currently in the state {512, 518}, this would correspond to an integer equal to 36. However, when the places are in ascending order, it is easy to identify a few states, without actually knowing the underlying process. For instance, a state 1 indicates the initial state and if no states higher than 256 are observed, 256 represents the final state. In order to resolve this, FIG. 5c randomises the order of the bits corresponding to the places, such that the bit-transformation cannot be reverse engineered to the execution of a specific activity for any state. In this example, the marking [512, 518] corresponds to an integer equal to 5.

Validating a Change in State

In more complex variants, the state of execution of the process in the smart contract can be represented as a matrix. FIG. 8a illustrates an example matrix. This matrix represents all the transitions presets, which are the input places to a transition. FIG. 8b represent all the transition postsets, which are the output places to a transition. Utilising matrices in this way, it is possible to determine which places are valid output places for a transition, and therefore whether execution of the process has occurred in a valid order. It is noted that each column of the matrix does not refer to a "state" in the process, as it only indicates which places are in the preset of a transition, by having a 1 instead of a 0 in the matrix. All places in the preset require a token for a transition to be enabled. However, when a certain transition T is enabled (i.e. it can execute) there may be many more places with a token. As these places are not in the preset of T, they are irrelevant for the enabling and firing of T. There may be multiple transitions for which the preset is (partially) "filled" at the same time. This allows identifying whether the subsequent executions on the blockchain are valid ones (i.e. whether they are allowed by the Petri net).

If the state of execution were currently at the state $S_1$ {512, 518}. A state vector $$V_{s1}=[0,0,1,0,0,1,0,0,0]$$

can be produced that represents a marking reflecting the current state. The set of enabled transitions at this state can be determined by performing a binary operation of each column in FIG. 6a by the state vector. The transitions vector $$V_{T1}=[0,0,1,0,1,0,0]$$

represents the transitions $T_1$ {534, 538} that are enabled at the state $S_1$.

As above, the process specification 110 may define the valid states and transitions for a process and the process specification 110 can be used to validate the execution of a process. That is, whether each of the states of the execution of a process is within the valid states of the process specification 110 and whether each of the enabled transitions at the corresponding states were validly enabled transitions of the process specification 110.

To identify whether a pair of subsequent states are caused by a valid transition, the following check can be performed. A state $S_2$ is represented by the vector $$V_{s2}=[0,0,1,0,0,0,0,1,0]$$

that represents the next state after $S_1$. The postsets, such as in FIG. 6b, can be used to determine the postset of the transitions that were executed between $S_1$ and $S_2$. Subsequently the set of transitions that were executed to obtain the new state $S_2$ can be determined. If the set of transitions that were executed does not match $T_1$ then the move from state $S_1$ to state $S_2$ constitutes an execution of one or more transitions that were not allowed by the process specification 110.

Homomorphic Encryption

Homomorphic encryption is a form of encryption that allows computation on ciphertexts, generating an encrypted result which, when decrypted, matches the result of the operations as if they had been performed on the plaintext. The purpose of homomorphic encryption is to allow computation on encrypted data.

In this disclosure it is preferred that a process state be encrypted with homomorphic encryption such that the process state is available to the owner of the process but not available to other participants of the process.

Figure 7:
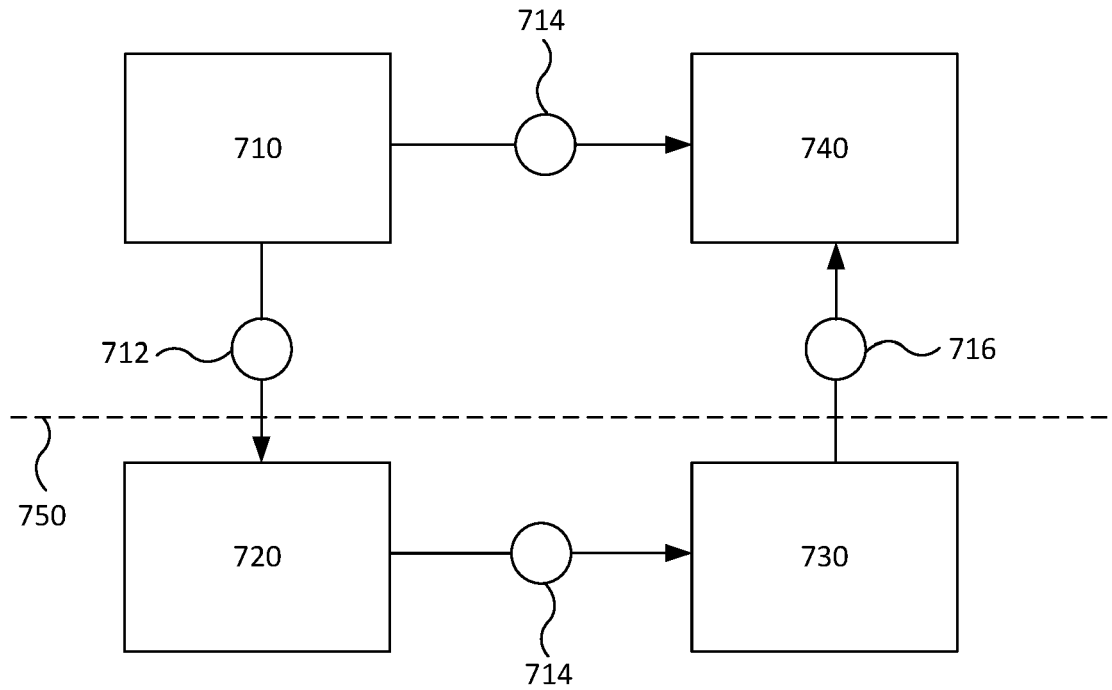
FIG. 7 is an illustration of homomorphic encryption.

FIG. 7 represents an illustration of the way in which homomorphic encryption works. The numerical representation 710 can be encrypted 712 to the encrypted numerical representation 720. An operation 714 can be performed on the encrypted numerical representation 720 to result in the modified encrypted numerical representation 730. The modified encrypted numerical representation 730 can be decrypted 716 to result in the output 740, which is equivalent to the same operation 714 being performed on the numerical representation 710.

In FIG. 7, the dotted line 750 represents a boundary for the public sharing of the numerical representation. That is, the encrypted numerical representation 720 and modified encrypted numerical representation 730 can be shared publicly. Further, the encrypted numerical representation 720 can also be modified 714 publicly. In this disclosure, it is the state of the process that can be encrypted and modified. That is the process state may change over the course of execution of the process but without revealing the details of the process or process state itself. Only those participants who have the ability to decrypt the encrypted numerical representation will be able to determine the details of the process or process state.

There are three types of homomorphic encryption considered in this disclosure: additive homomorphic, multiplicative homomorphic and fully homomorphic. Additive homomorphic encryption is where the operation 714 is an addition operation. Similarly multiplicative homomorphic encryption is where the operation 714 is a multiplication operation. Fully homomorphic encryption is where the operation 714 is arbitrary. Given the way in which the state can be easily modified to another state simply through basic operations, additive homomorphic encryption is all that is required. However, the multiplicative and fully homomorphic encryption would work as well.

Example Participant

Figure 8:
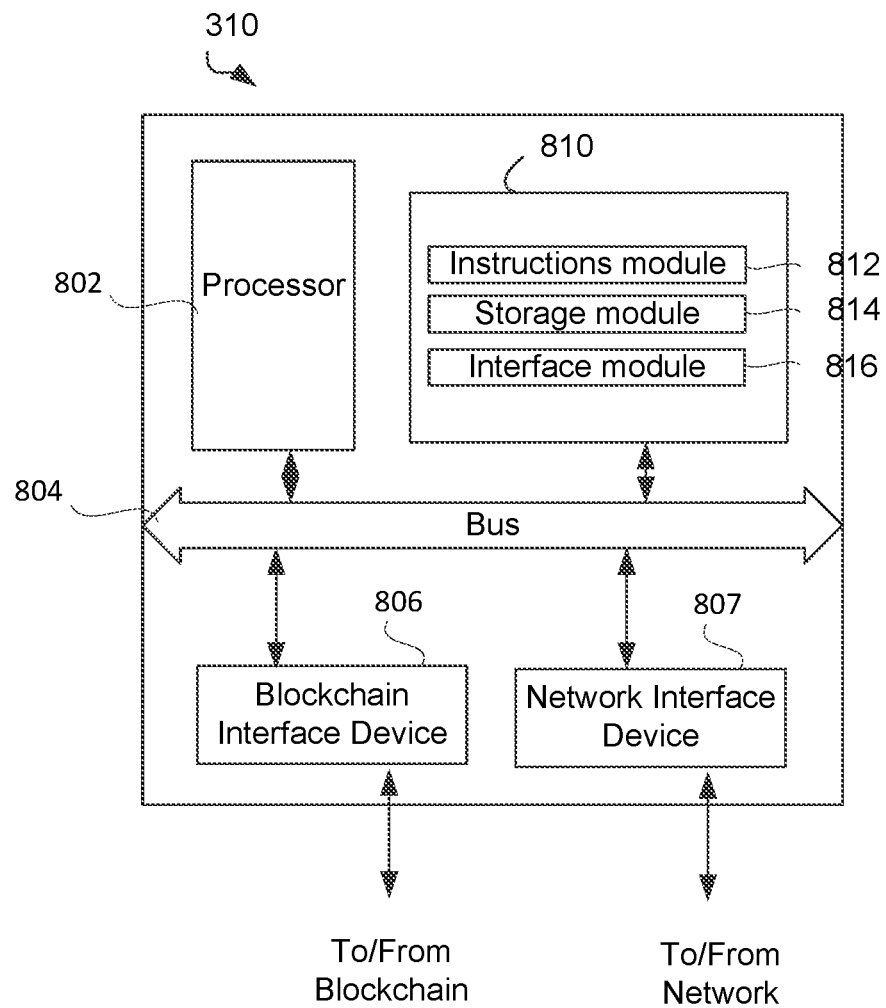
FIG. 8 is an example participant computer node.

Each participant in a process may require a computer node that can interact with a blockchain system. One such computer node is shown in FIG. 8. This node includes a processor 802, a memory 810, a blockchain interface device 806 and network interface device 807 that communicate with each other via a bus 804. The memory stores instructions 812, 814 and 816 and data for the system and processes described with reference to FIGS. 1 to 7, and the processor performs the instructions from the memory to implement the processes.

The processor 802 performs the instructions stored on memory 810. Processor 802 receives a trigger by determining a change in state on the blockchain from the network interface device 806. Processor 802 determines an instruction according to the Instructions module 812, which may include executing a subcontract or a function to communicate with the process instance 170. The processor may execute instructions in the storage module 814 to store data on the blockchain. The processor 802 may execute instructions stored in the interface module 816 to communicate with an interface 807 to interface with other participants without having to utilise the blockchain.

Further Example

As explained above, a process state is represented as a numerical representation, such as a bitset. Each subsequent state of the process (represented as a Petri net marking) is stored on the blockchain in the form of a smart contract created by processor 802, such that the execution of the process can be monitored. In order to ensure that the state itself cannot be reverse engineered when the underlying process is unknown (e.g. by unauthorised parties), each state is transformed into an integer (also part of the numerical representation), which is meaningless without knowledge of the underlying Petri net.

Figure 9A:
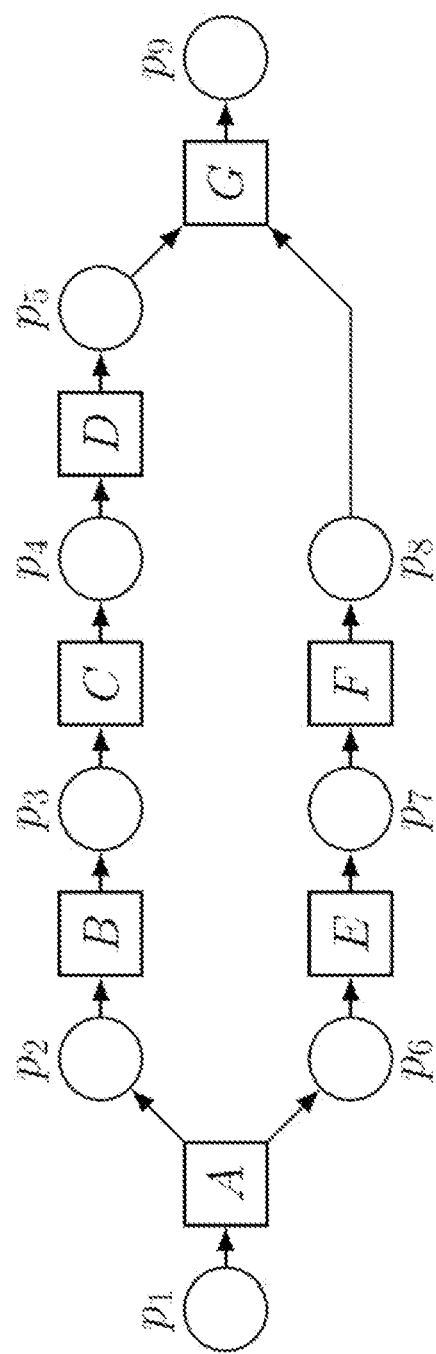
FIG. 9a provides an example of a Petri net that is to be executed on the blockchain.

FIG. 9a provides an example of a Petri net that represents a nominal (i.e. compliant) operation of the process to be executed on the blockchain. The challenge here is to keep track of subsequent states (i.e. Petri net markings) on the blockchain, such that anyone familiar with the process (i.e. has access to the unencrypted data) can identify the Petri net state at a given point in time, and others (i.e. without access to the unencrypted data) cannot. In addition, the aim is to avoid the key distribution problem, meaning that the method refrains from encrypting the state itself. As such, there is disclosed herein a method that transforms a given Petri net marking into a numerical representation in the form of an integer, which without knowledge of the underlying process cannot be used to derive subsequent process steps or even the actual status of the process.

Figure 9B:
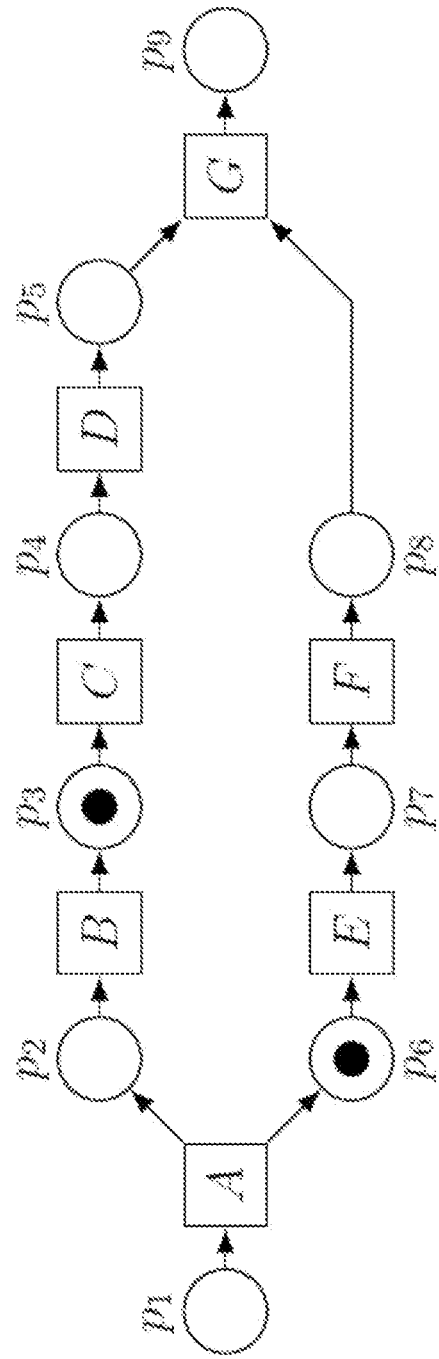
FIG. 9b illustrates an example marking to explain how a marking can be transformed into an integer.
Figures 10A, 10B:
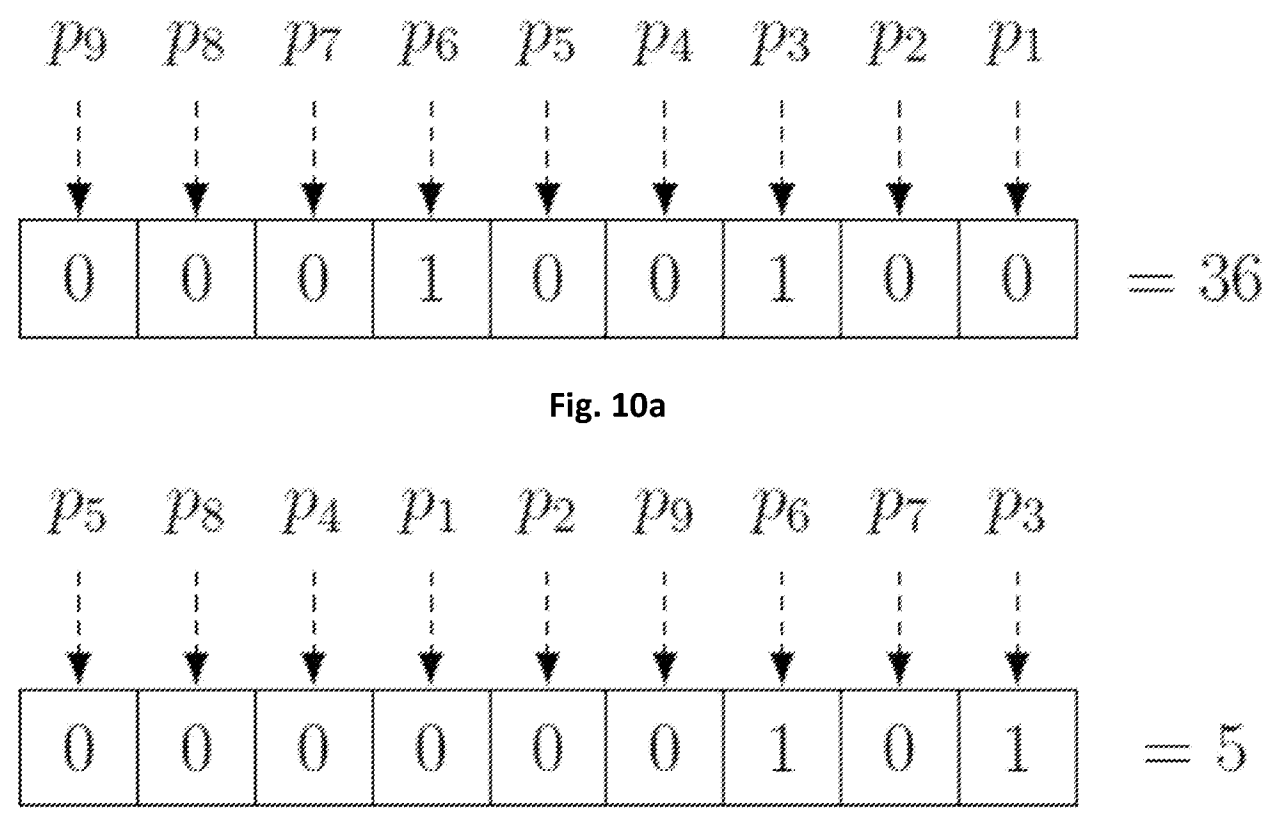

FIG. 9b illustrates an example marking to explain how a marking can be transformed into an integer. FIG. 10a shows an ascending ordering of places. Each place is represented by a bit in a bit array. Whenever the place contains a token, the corresponding bit is set to 1, or 0 otherwise. Consequently, the shown marking $\{p_3, p_6\}$ corresponds to an integer equal to 36. However, when the places are in ascending order, it is easy to identify a few states, without actually knowing the underlying process. For instance, a state 1 indicates the initial state and if no states higher than 256 are observed, 256 represents the final state. In order to resolve this, FIG. 10b randomises the order of the bits corresponding to the places, such that the bit-transformation cannot be reverse engineered to the execution of a specific activity for any state. In this example, the marking $\{p_3, p_6\}$ corresponds to an integer equal to 5.

Table 1 below shows an example of the subsequent markings of an execution of the Petri net, along with the corresponding state representations, based on the conversion of FIG. 10b. The array of subsequent states of the execution $\langle A, B, C, E, D, F, G \rangle$ then would be [32, 20, 5, 68, 66, 258, 384].

TABLE 1

| Transition | Marking | Bit array | State |
| --- | --- | --- | --- |
| — | $\{p_1\}$ | 000100000 | 32 |
| A | $\{p_2, p_6\}$ | 000010100 | 20 |
| B | $\{p_3, p_6\}$ | 000000101 | 5 |
| C | $\{p_4, p_6\}$ | 001000100 | 68 |
| E | $\{p_4, p_7\}$ | 001000010 | 66 |
| D | $\{p_5, p_7\}$ | 100000010 | 258 |
| F | $\{p_5, p_8\}$ | 110000000 | 384 |
| G | $\{p_9\}$ | 000001000 | 8 |

When the execution of C and E is swapped, the array of subsequent states would be [32, 20, 5, 3, 66, 258, 384], as shown in Table 2 below. Note that only one state is different. In addition, it would be easy to check for "impossible" states, i.e. states that constitute a marking that is not allowed by the underlying Petri net (e.g. $\{p_2\}$).

TABLE 2

| Transition | Marking | Bit array | State |
| --- | --- | --- | --- |
| — | $\{p_1\}$ | 000100000 | 32 |
| A | $\{p_2, p_6\}$ | 000010100 | 20 |
| B | $\{p_3, p_6\}$ | 000000101 | 5 |
| E | $\{p_3, p_7\}$ | 000000011 | 3 |
| C | $\{p_4, p_7\}$ | 001000100 | 66 |
| D | $\{p_5, p_7\}$ | 100000010 | 258 |
| F | $\{p_5, p_8\}$ | 110000000 | 384 |
| G | $\{p_9\}$ | 000001000 | 8 |

The following description provides bitset operations to simulate process execution. The bitset operations can then be encoded as smart contracts on the blockchain. FIG. 11 shows the matrix representation of the process depicted in FIG. 9a. The columns represent the transitions, where the 1's denote which places (rows) in the preset or postset of each transition.

Sub-matrix A denotes all presets, whereas sub-matrix B denotes the postsets. Consider a state vector C, shown the table below, representing the state of the process at a certain point in time. That is, vector C represents a marking where C and E are enabled.

TABLE 4

| $p_1$ | $p_2$ | $p_3$ | $p_4$ | $p_5$ | $p_6$ | $p_7$ | $p_8$ | $p_9$ |
| --- | --- | --- | --- | --- | --- | --- | --- | --- |
| 0 | 0 | 1 | 0 | 0 | 1 | 0 | 0 | 0 |

Subsequently, a binary operation on each column i in A by a state vector C generates a set of enabled transitions E as follows:

$$E_i = \begin{cases} 1 & \text{if } |A_i^T \wedge C| = |A_i^T| \\ 0 & \text{otherwise} \end{cases}.$$

The table below shows the vector E indicating the enabled transitions at state C:

TABLE 5

| A | B | C | D | E | F | G |
| --- | --- | --- | --- | --- | --- | --- |
| 0 | 0 | 1 | 0 | 1 | 0 | 0 |

Subsequently, $E \times \{A, B, C, D, E, F, G\}$ returns the set $\{C, E\}$, denoting the enabled transitions. Whenever a transition $t_i$ fires, the new state C' is defined as follows: $C' = (C \oplus A_i^T) \vee B_i^T$. Note that in Table 4 and 5 the places and transition labels are shown for readability purposes only, as they are not in the respective vectors.

To identify whether a pair of subsequent states are caused by a valid transition, the following check can be performed. Suppose we have a subsequent state $C_2$ (shown in Table 6) following C from Table 4.

TABLE 6

Vector $C_2$.

| $p_1$ | $p_2$ | $p_3$ | $p_4$ | $p_5$ | $p_6$ | $p_7$ | $p_8$ | $p_9$ |
|---|---|---|---|---|---|---|---|---|
| 0 | 0 | 1 | 0 | 0 | 0 | 0 | 1 | 0 |

From here processor 802 can calculate Ca to obtain the set of places that represent the postsets of the transitions that were executed between C and $C_2$: $C^\partial = C_2 \oplus (C_2 \wedge C)$:

| $p_1$ | $p_2$ | $p_3$ | $p_4$ | $p_5$ | $p_6$ | $p_7$ | $p_8$ | $p_9$ |
|---|---|---|---|---|---|---|---|---|
| 0 | 0 | 0 | 0 | 0 | 0 | 0 | 1 | 0 |

Next, processor 802 obtains the set of transitions Ea that were fired to obtain the new marking:

$$E_i^\partial = \begin{cases} 1 & \text{if } |B_i^T \wedge C^\partial| = |B_i^T| \\ 0 & \text{otherwise} \end{cases}.$$

which means the numerical representation of the process stored in A and B is used as an input to the calculations of the smart contract that encodes the above equation. More particularly, the above equation (and therefore the smart contract) comprises the binary AND operation based on the current state vector $C_2$ (which is used to calculate $C^\partial$) and the nominal vectors $B_i$. Similarly, the calculation is also based on the previous state vector C.

Finally, if $E \neq E^\partial$ then the move from C to $C_2$ constitutes the execution of one or more transitions that were not allowed at state C by the process specification. Note that the formulas to obtain E and $E^\partial$ assume that the underlying Petri net is sound and, more specifically, no transitions have an empty preset or postset. That is: $\not\exists\, t: \bullet t = \emptyset \vee t\bullet = \emptyset$.

Transitions with Matching Pre- and Postsets

Figure 12A:
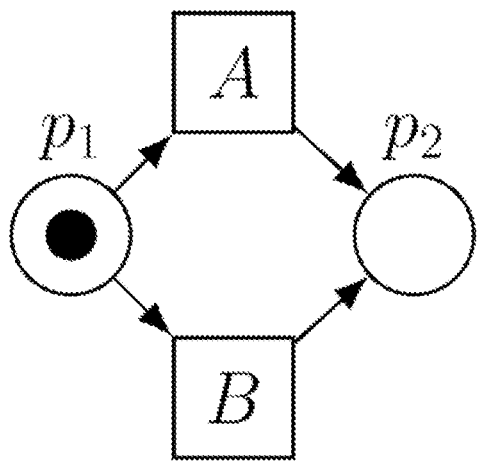
FIG. 12a illustrates two transitions with matching pre- and postsets.

The state conversion method described above works well in examples where every transition has a unique pre- and postset pair. That is, there exist no two transitions $t_i$ and $t_j$ for which $\bullet t_i = \bullet t_j \wedge t_i \bullet = t_j \bullet$. However, FIG. 12a shows an example where a simple XOR-split and subsequent XOR-join already violate this assumption, where A and B share both the same preset (i.e. $p_1$) and the same postset (i.e. $p_2$).

Figure 12B:
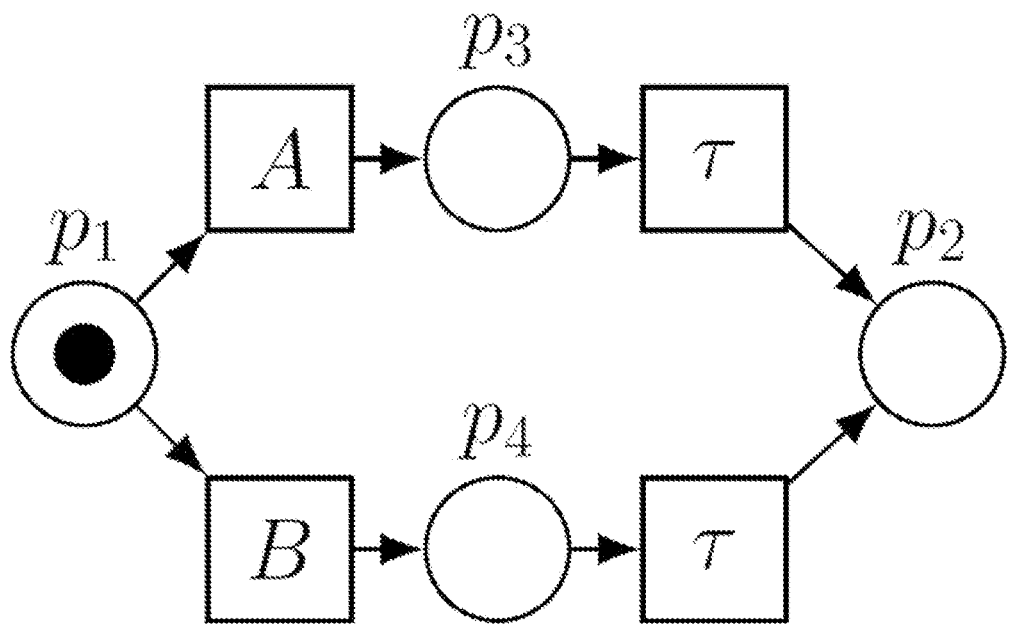
FIG. 12b illustrates two transitions with matching presets and unique postsets after adding silent τ transitions.

Consequently, a state transition from marking $\{p_1\}$ to $\{p_2\}$ does not provide any information whether A or B has executed. This issue can be resolved by adding a so-called silent or τ transition to each exclusive branch, such that each visible transition (i.e. A and B) has a unique postset. FIG. 12b4 shows this idea graphically, where $A\bullet = \emptyset = \{p_3\}$ and $B\bullet = \emptyset = \{p_4\}$.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for monitoring a current operation of a process, the method comprising:
    creating a first numerical representation of a nominal operation of the process, wherein the first numerical representation comprises numerical values to define a set of transitions of the nominal operation of the process;
    encrypting the first numerical representation using homomorphic encryption to determine an encrypted numerical representation that blocks access to the first numerical representation but allows calculations on the first numerical representation;
    creating smart contracts on a blockchain platform using the encrypted numerical representation as a first input to the calculations of the smart contract;
    attempting execution of the smart contract using a second numerical representation of the current operation of the process as a second input to the calculations of the smart contract, execution of the smart contract generating an output result by performing the calculations on the encrypted numerical representation; and
    based on the output of the execution of the smart contract determining that the current operation is outside the nominal operation.

2. The method of claim 1, wherein determining that the current operation is outside the nominal operation is in response to determining failure to execute the smart contract.

3. The method of claim 1, further comprising blocking the current operation of the process upon determining that the current operation is outside the nominal operation.

4. The method of claim 1, further comprising upon determining that the current operation is outside the nominal operation, allowing further execution of the process and generating a report indicating that the current operation is outside the nominal operation.

5. The method of claim 1, wherein creating the first numerical representation of the nominal operation comprises creating a petri net of the nominal operation and creating a numerical representation of the petri-net.

6. The method of claim 1, wherein the first numerical representation
    is indicative of places of the nominal operation and valid transitions between the places,
    comprises multiple binary nominal vectors, and
    each of the multiple binary nominal vectors represents one of the valid transitions between the places.

7. The method of claim 6, wherein the multiple binary nominal vectors comprise for each transition a binary preset vector indicative of one or more places that enable that transition and a binary postset vector indicative of one or more possible places after that transition.

8. The method of claim 6, wherein creating the first numerical representation comprises determining multiple traces through the places and transitions and determining the preset vectors and postset vectors such that the preset vectors and postset vectors represent the multiple traces.

9. The method of claim 6, wherein the second numerical representation of the current operation of the process comprises a binary current state vector and the smart contracts comprise a binary operation based on the current state vector and the encrypted nominal vectors.

10. The method of claim 9, wherein the calculations of the smart contracts comprise a binary operation based on a previous state vector indicative of a previous state of the operation.

11. The method of claim 10, wherein the calculations of the smart contracts comprise a binary operation between an encrypted previous state vector and an encrypted current state vector.

12. The method of claim 11, wherein the calculations of the smart contract comprise a selection of transitions based on a binary operation using an encrypted postset vector and based on the encrypted postset vector.

13. The method of claim 12, wherein the calculations of the smart contract comprise a condition that the result of the selection is equal to a set of transitions enabled by the current state of the operation.

14. The method of claim 13, wherein attempting execution of the smart contract comprises attempting to satisfy the condition by performing the calculations.

15. The method of claim 11, wherein the calculations of the smart contract comprise a binary AND operation between an encrypted previous state vector and an encrypted current state vector and a binary XOR operation between the encrypted current state vector and the result of the AND operation.

16. The method of claim 15, wherein the calculations of the smart contract comprise a selection of transitions where the result of an AND operation between the encrypted postset vector and the result of the XOR operation is equal to the encrypted postset vector.

17. The method of claim 1, wherein the smart contract is configured such that a success of the execution of the smart contract leads to integration of a transaction into the blockchain.

18. The method of claim 17, wherein the transaction integrated into the blockchain represents a valid transition to the current state.

19. The method of claim 1, wherein creating the smart contracts comprises checking the smart contracts for compliance against a set of rules.

20. A non-transitory computer readable medium with software code stored thereon that, when executed by a computer, causes the computer to perform the method of claim 1.

21. A system for monitoring a current operation of a process, the system comprising:
a data store;
a processor configured to:
create a first numerical representation of a nominal operation of the process and store the created numerical representation on the data store, wherein the first numerical representation comprises numerical values to define a set of transitions of the nominal operation of the process;
encrypt the first numerical representation using homomorphic encryption to determine an encrypted numerical representation that blocks access to the first numerical representation but allows calculations on the first numerical representations;
create smart contracts on a blockchain platform using the encrypted numerical representation as a first input to the calculations of the smart contract;
attempt execution of the smart contract using a second numerical representation of the current operation of the process as a second input to the calculations of the smart contract, execution of the smart contract generating an output result by performing the calculations on the encrypted numerical representation; and
based on the output of the execution of the smart contract determining that the current operation is outside the nominal operation.

22. A method for monitoring a current operation of a process, the method comprising:
converting transitions of a nominal operation of the process into a first numerical representation of the nominal operation of the process;
encrypting the first numerical representation using homomorphic encryption to determine an encrypted numerical representation that blocks access to the first numerical representation but allows calculations on the first numerical representation;
creating smart contracts on a blockchain platform using the encrypted numerical representation as a first input to the calculations of the smart contract;
attempting execution of the smart contract using a second numerical representation of the current operation of the process as a second input to the calculations of the smart contract, execution of the smart contract generating an output result by performing the calculations on the encrypted numerical representation; and
based on the output of the execution of the smart contract determining that the current operation is outside the nominal operation.

* * * * *